United States Patent [19]
Asakura et al.

[11] Patent Number: 5,524,806
[45] Date of Patent: Jun. 11, 1996

[54] PINCH ROLLER DRIVE MECHANISM

[75] Inventors: Naoki Asakura; Tomoaki Ide, both of Nagaokakyo, Japan

[73] Assignee: Mitsubishi Denki Kabushiki Kaisha, Tokyo, Japan

[21] Appl. No.: 295,110

[22] Filed: Aug. 24, 1994

[30] Foreign Application Priority Data

Aug. 25, 1993 [JP] Japan ..................... 5-210380

[51] Int. Cl.⁶ ................................ G11B 15/28
[52] U.S. Cl. ..................... 226/179; 226/187; 242/354
[58] Field of Search ................... 226/179, 180, 226/187; 242/332, 345.1, 354; 360/85, 95

[56] References Cited

U.S. PATENT DOCUMENTS 4,652,946  3/1987  Ryan .................... 242/332 X
5,093,752  3/1992  Sato et al. ................... 360/85

FOREIGN PATENT DOCUMENTS

0192448   8/1986   European Pat. Off. .
4340820   6/1994   Germany .
59-42354  3/1984   Japan .
60-202565 10/1985  Japan .
63-96761  4/1988   Japan .

Primary Examiner—John P. Darling

[57] ABSTRACT

A tape loading mechanism having a guide member provided on a pinch roller unit to prevent a cam follower provided on the pinch roller unit from coming off a cam groove, and capable of smoothly moving the pinch roller unit. A sliding face provided on the pinch roller unit moves sliding along the rim of a cam to impart rotating force to the pinch roller unit so that the pinch roller moves away from a capstan shaft, and therefore the pinch roller can be moved completely away from the capstan shaft.

8 Claims, 8 Drawing Sheets

PINCH ROLLER DRIVE MECHANISM

BACKGROUND OF THE INVENTION

1. Field of the Invention

The present invention relates to a tape loading mechanism, and more particularly to a pinch roller drive mechanism to guide a magnetic tape.

2. Description of Related Art

Figure 1:
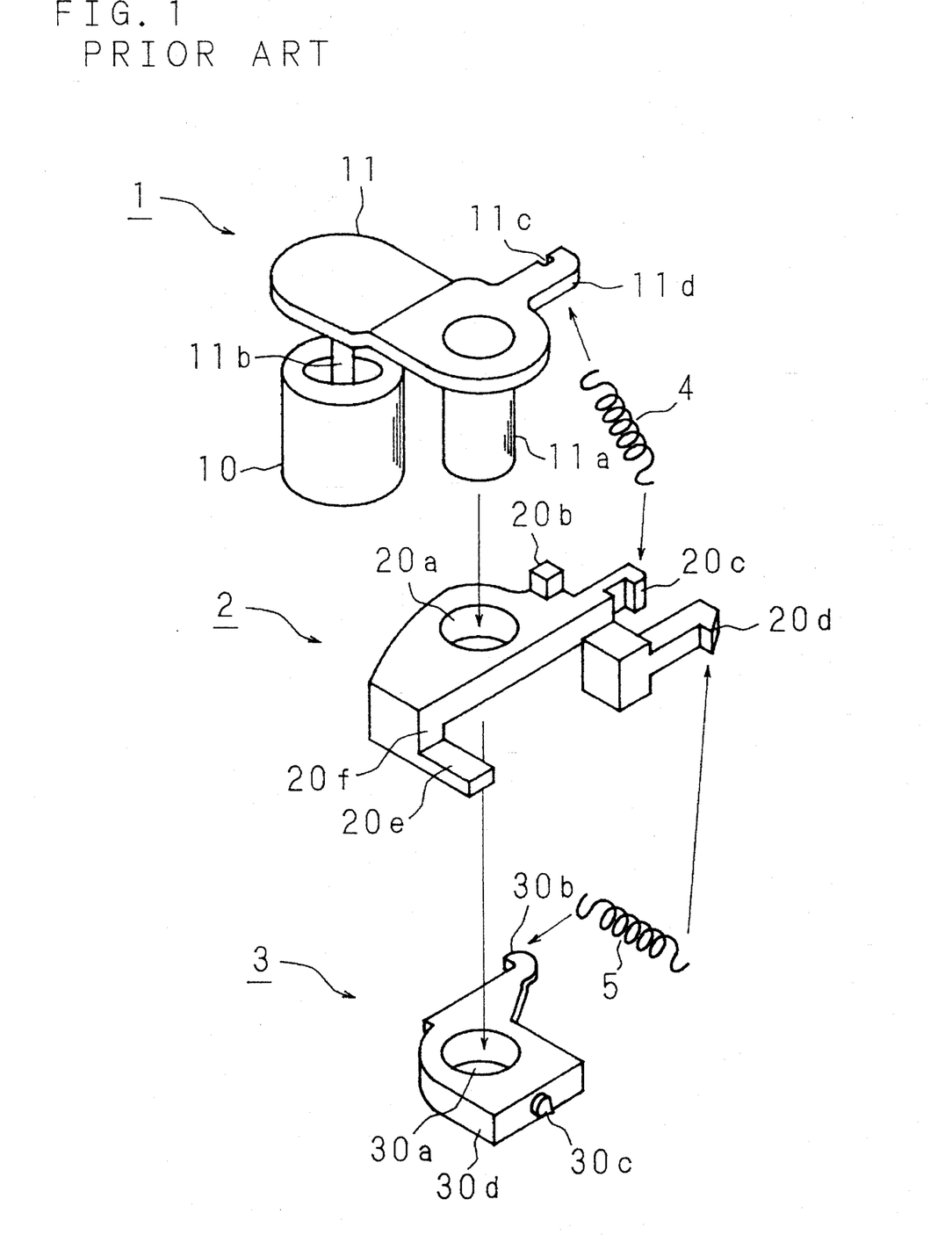
FIG. 1 is an oblique view of the constitution of a pinch roller unit of the prior art.

FIG. 1 is an oblique view of the constitution of a pinch roller unit of the prior art. In FIG. 1, numeral 1 denotes a pinch roller member which has a pinch roller 10 with which a magnetic tape is brought into contact., an L-shaped base 11 to hold the pinch roller 10, a hollow shaft 11a located at the center of the base 11, a rotary shaft 11b of the pinch roller 10 located at one end of the base 11, a U-shaped hook 11c located at the other end and a contact face 11d located at the opposite side of the hook 11c.

Numeral 2 denotes a rotary member to rotate the pinch roller member 1. The rotary member 2 has a hole 20a through which the hollow shaft 11a of the pinch roller member 1 is inserted, a projection 20b with which the contact face 11d comes in contact so as to prevent the pinch roller member 1 from rotating beyond a specified amount, hooks 20c and 20d, a projection 20e and a contact face 20f. A spring 4 is provided to link the hook 20c to the hook 11c of the pinch roller member 1, so that the force to press the pinch roller 10 against a capstan shaft is imparted to the pinch roller member 1. The capstan shaft is made to rotate by a capstan motor which supplies the force to drive the magnetic tape to run.

Numeral 3 denotes a sliding member which causes the pinch roller member 1 and the rotary member 2 to slide in the direction along the shaft, and has a hole 30a through which the hollow shaft 11a of the pinch roller member 1 is inserted, a hook 30b, a projection 30c to slide along a cam groove of a cam to be described later, and a contact face 30d. A spring 5 is provided to link the hook 30b to the hook 20d of the rotary member 2, so that the force to pull the pinch roller 10 away from the capstan shaft is imparted to the pinch roller member 1. The pinch roller member 1, the rotary member 2 and the sliding member 3 constitute the pinch roller unit.

Figure 2A:
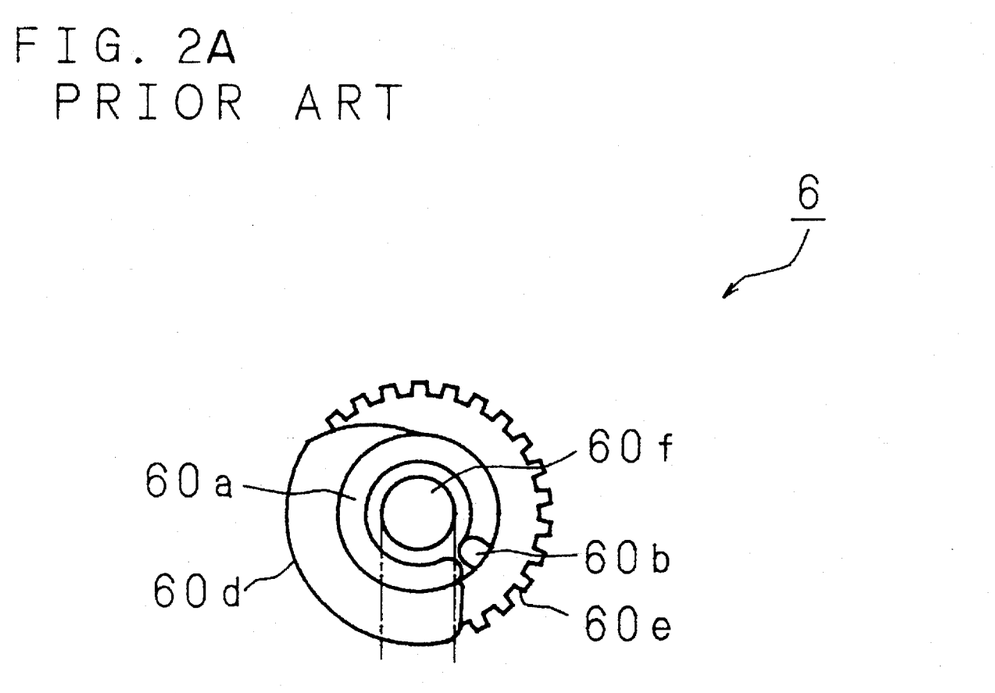
FIG. 2 is a plan view and a side view of a cam structure of the prior art.
Figure 2B:
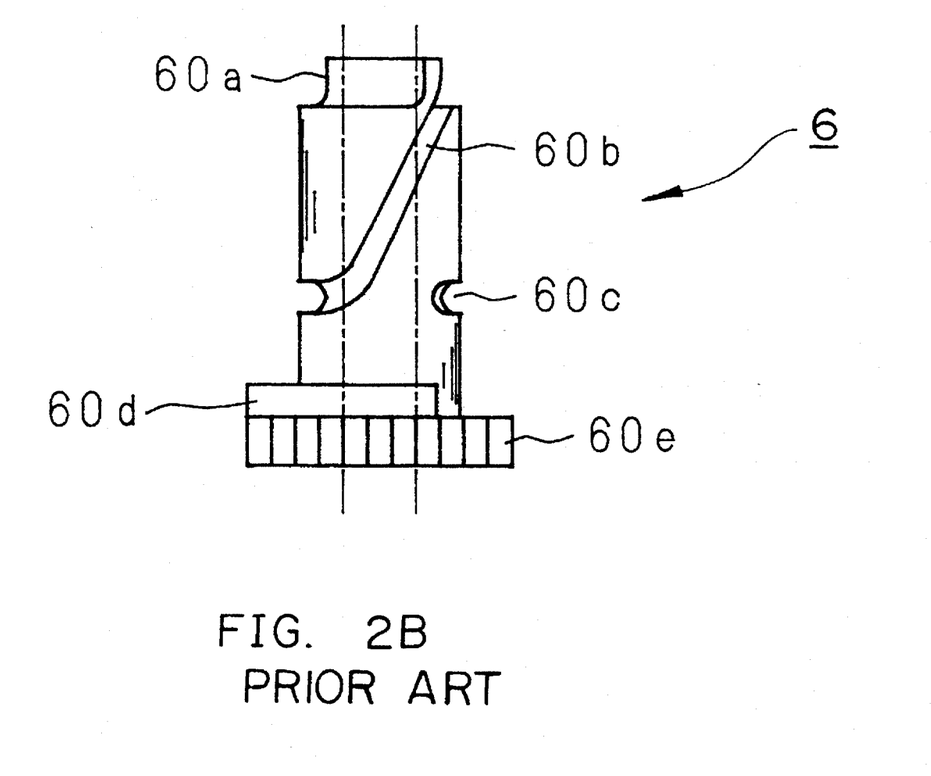

FIG. 2 is a plan view and a side view of the cam of the prior art. In FIG. 2, numeral 6 denotes a cam having a hole 60f which penetrates through the cam in the direction of the axis thereof, and helical cam grooves 60a, 60b and 60c are cut thereon and a rim 60d and a gear 60e are provided below the cam grooves 60a, 60b and 60c. A cam follower 30c of the sliding member 3 slides along the cam grooves 60a, 60b and 60c.

Figure 3:
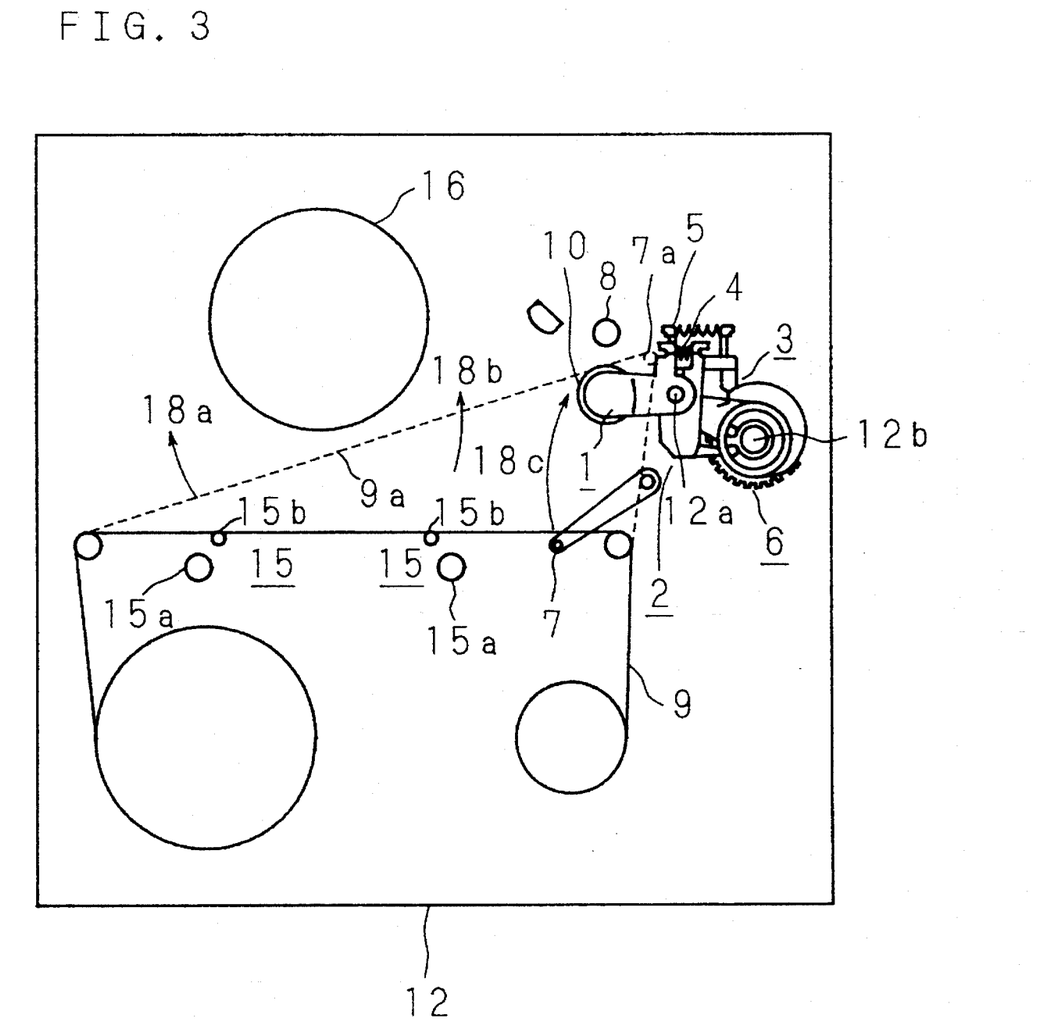
FIG. 3 is a schematic plan view of a tape drive system of an ordinary magnetic recording/reproducing apparatus before loading.
Figure 4:
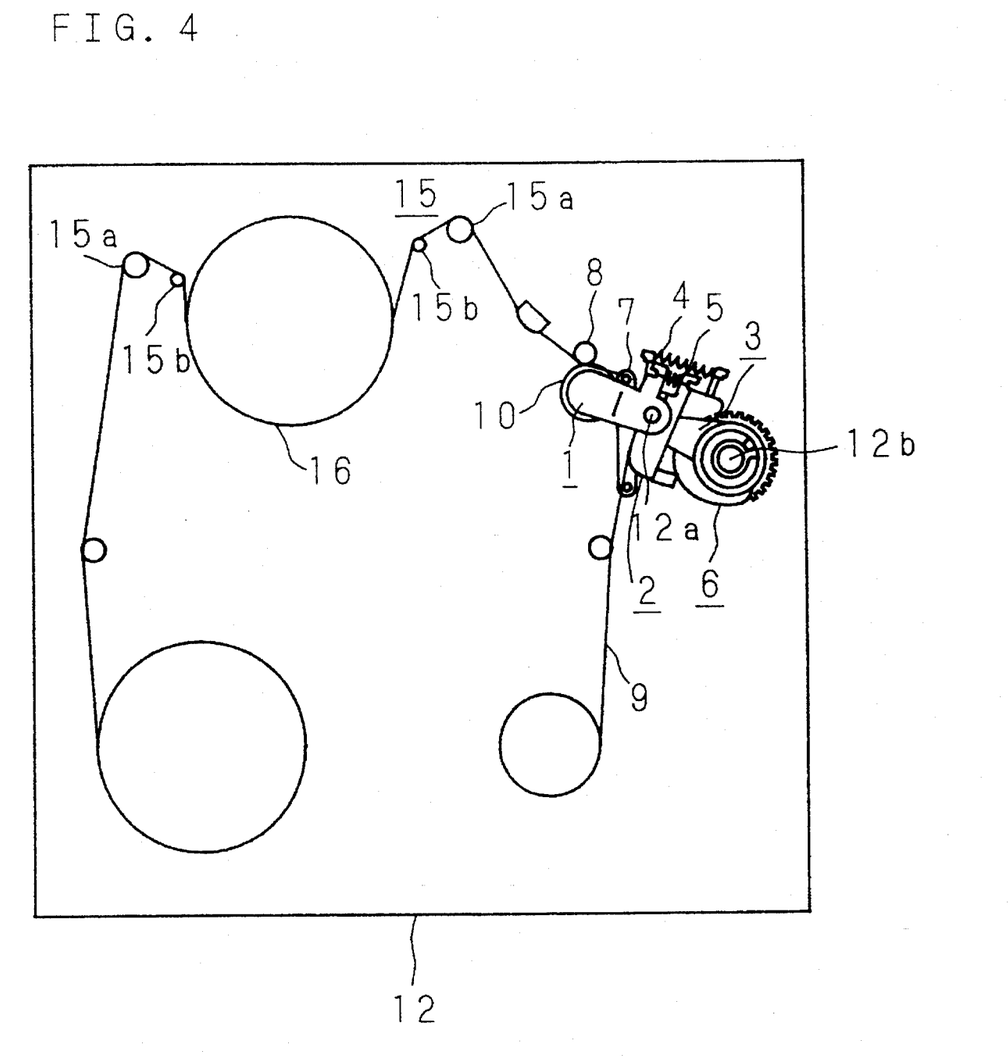
FIG. 4 is a schematic plan view of the tape drive system of the ordinary magnetic recording/reproducing apparatus after loading.

Now the operation of the pinch roller unit having such a constitution as described above in a magnetic recording/reproducing apparatus will be described. FIG. 3 and FIG. 4 are schematic plan views of a tape drive system of an ordinary magnetic recording/reproducing apparatus. FIG. 3 shows the state before loading and FIG. 4 shows the state after loading. As shown in FIG. 3, a magnetic tape 9 is set in the magnetic recording/reproducing apparatus, and a guide pole 7 is moved in the direction of arrow 18c by a loading motor not shown in the drawing, thereby drawing the magnetic tape 9 toward a rotary drum 16 (as shown with a broken line 9a). Then guide rollers 15 comprising rollers 15a and guide poles 15b draw the magnetic tape 9 in the directions of arrows 18a and 18b and wind it around the rotary drum 16 as shown in FIG. 4.

Figure 5:
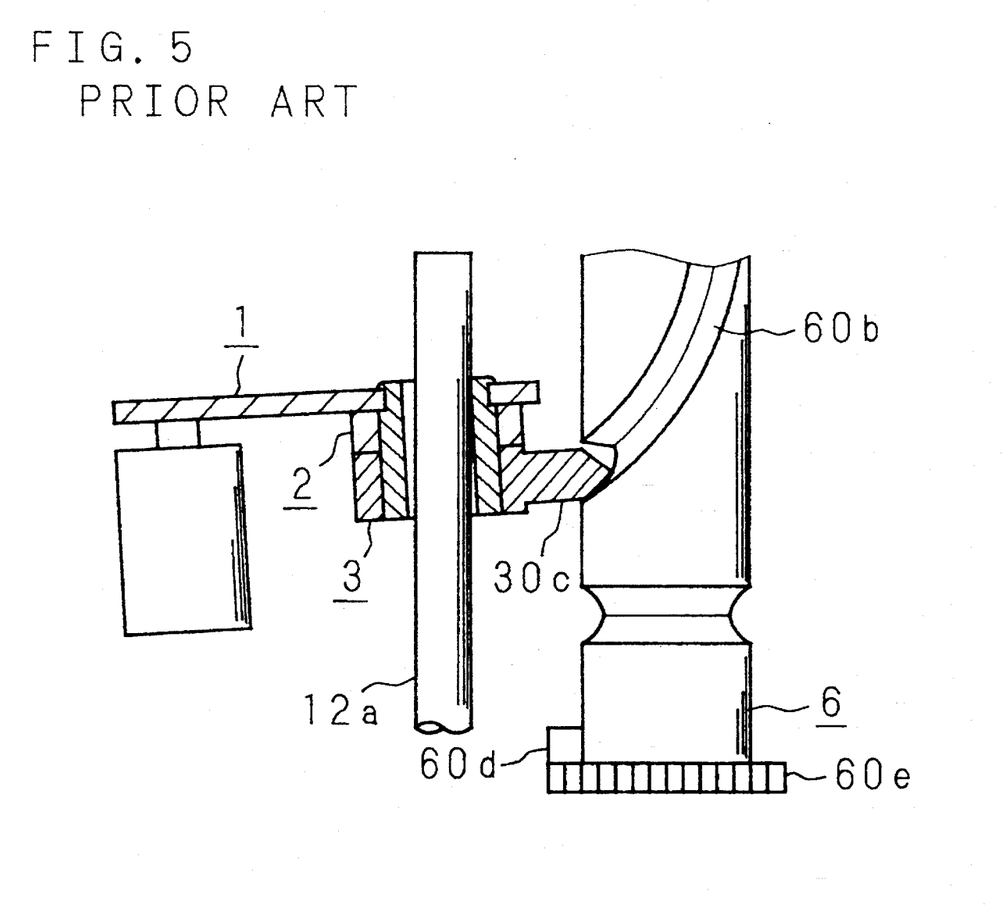
FIG. 5 is a partially sectional view of the pinch roller unit of the prior art during its sliding motion.

The operation of the pinch roller during the loading of the magnetic tape 9 will be described below. As shown in FIG. 3, a rotary shaft 12a and a rotary shaft 12b are provided near the capstan shaft 8 and the hollow shaft 11a of the pinch roller unit is set movably in the rotary shaft 12a, while a cam 6 is set movably in the rotary shaft 12b. As the cam 6 is driven by the loading motor to rotate counterclockwise and the cam follower 30c of the sliding member 3 slides along the cam grooves 60a and 60b, the pinch roller unit moves sliding downward. FIG. 5 is a partially sectional view of the state of the pinch roller unit during the sliding motion. When the cam follower 30c reaches the cam groove 60c, the downward movement stops. Then as the projection 20e of the rotary member 2 rotates clockwise along the rim 60d of the cam 6, the spring 4 pulls the pinch roller member 1, thereby rotating the rotary member 2 and the pinch roller member 1 clockwise. At this time, the spring 5 is stretched.

As the pinch roller member 1 rotates clockwise as described above, the pinch roller 10 moves toward and comes in contact with the capstan shaft 8. Then the pinch roller member 1 is locked and only the rotary member 2 rotates clockwise so as to stretch the spring 4. The resilient force of the spring 4 imparts pressing force to the pinch roller 10, and thus the loading operation is completed.

When unloading, the cam 6 is driven by the loading motor to rotate clockwise, so that the rotary member 2 rotates counterclockwise to contract the spring 5. The contracting force of the spring 5 causes the pinch roller member 1 to rotate counterclockwise, thereby contracting the spring 4 and rotating the rotary member 2 counterclockwise. Thus, the pinch roller 10 is moved away from the capstan shaft 8.

The reason for the pinch roller 10 to move away from the capstan shaft 8 is because contracting force of the stretched spring 4 drives the pinch roller member 1 to rotate counterclockwise. The pinch roller 10, however, occasionally does not move away from the capstan shaft 8 smoothly due to the loading force of the spring 4. The magnetic tape 9 is damaged in such a case.

Also, the cam follower 30c occasionally does not slide smoothly along the cam groove 60b when the pinch roller unit moves sliding as shown in FIG. 5. This is because the weight of the pinch roller unit on the cam follower 30c side and that on the pinch roller 10 side is not well balanced, and because the cam and the pinch roller unit are linked via the cam follower 30c alone. In case the cam follower 30c does not slide smoothly along the cam groove 60b, there is a possibility of the cam follower 30c coming off the cam groove 60b.

SUMMARY OF THE INVENTION

The present invention has been devised in order to solve the above problems. One object of the invention is to provide a tape loading mechanism wherein a pinch roller unit slides along a cam groove smoothly during the loading/unloading operation, and another object of the invention is to provide a magnetic reproducing apparatus wherein a pinch roller is completely moved away from a capstan shaft.

The tape loading mechanism of the invention has a capstan shaft, a pinch roller to press a magnetic tape against the peripheral surface of the capstan shaft, a pinch roller unit which rotates around its axis in such a direction as the pinch roller moves toward/away from the capstan shaft, and a cam capable of rotating around its axis and having a groove to make the pinch roller unit rotate and move in the axial direction. The pinch roller unit has a cam follower which slides in the groove and a guide member provided along the cam.

Also in the tape loading mechanism of the invention, the guide member is in a cylindrical shape so as to surround the cam.

Consequently, because the guide member is provided along the cam and the cam follower of the pinch roller unit slides in the groove under a constant load, the pinch roller unit moves smoothly without coming off the groove.

Also the tape loading mechanism of the invention has a capstan shaft, a pinch roller to press the magnetic tape against the peripheral surface of the capstan shaft and a cam provided with a groove and first and second rims to make the pinch roller unit rotate around its axis in such a direction as the pinch roller moves toward/away from the capstan shaft. The pinch roller unit has a cam follower which slides in the groove, a first sliding face which slides along the first rim in the direction as the pinch roller moves toward the capstan shaft and a second sliding face which slides along the second rim in the direction as the pinch roller away from the capstan shaft.

Consequently, because the second sliding face slides along the rim of the cam in such a direction as the pinch roller moves away from the capstan shaft, rotating force is imparted to the pinch roller unit to make the pinch roller move completely away from the capstan shaft.

The above and further objects and features of the invention will more fully be apparent from the following detailed description with accompanying drawings.

DESCRIPTION OF THE PREFERRED EMBODIMENTS

The invention will be described in detail below with reference to the drawings illustrative of the preferred embodiments.

Figure 6:
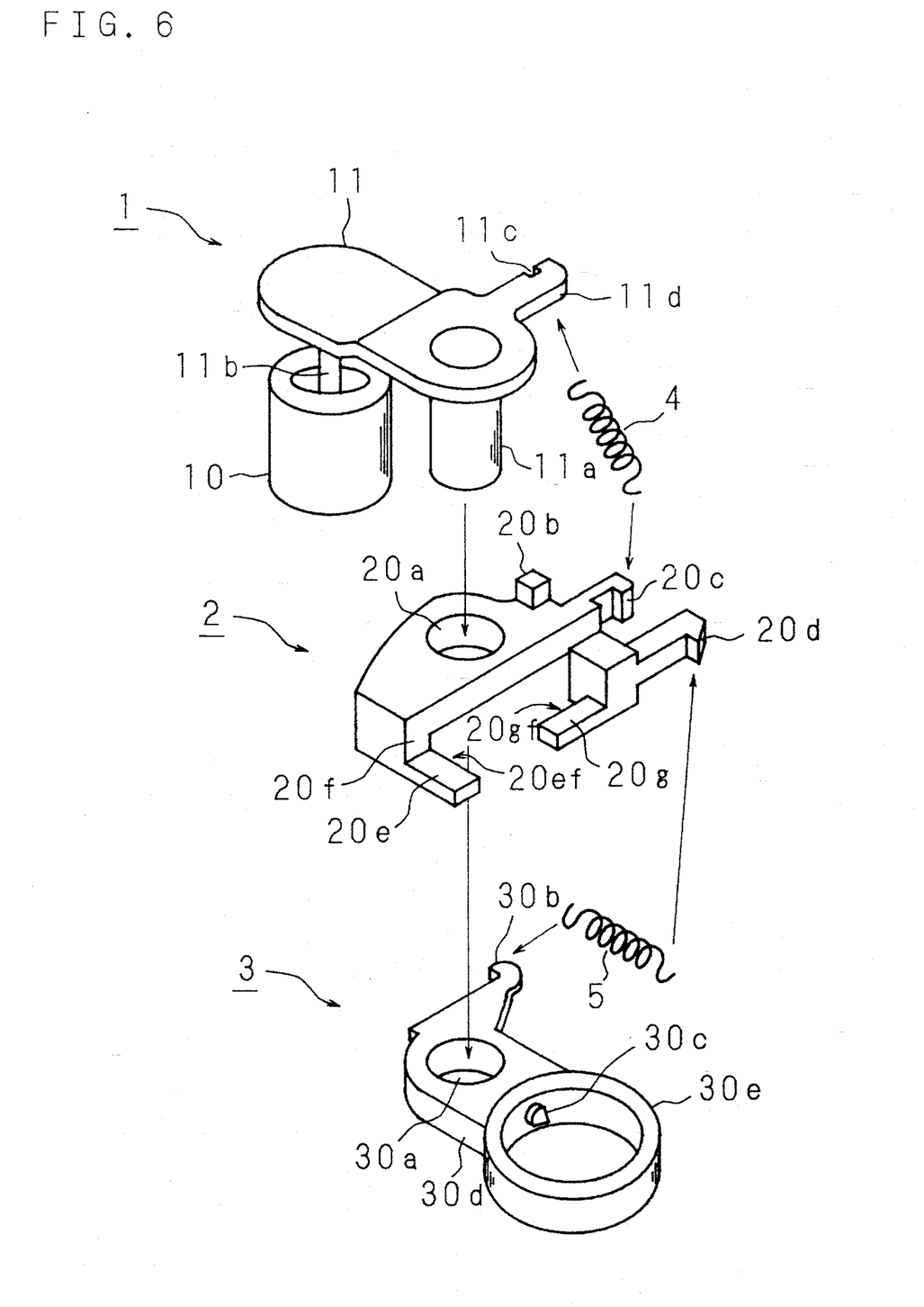
FIG. 6 is an oblique view of a pinch roller unit of the invention.

FIG. 6 is an oblique view of the constitution of a pinch roller unit of the invention. In FIG. 6, numeral 1 denotes a pinch roller member provided with a pinch roller 10 with which a magnetic tape is brought into contact, an L-shaped base 11 to hold the pinch roller 10, a hollow shaft 11a located at the center of the base 11, a rotary shaft 11b of the pinch roller 10 located at one end of the base 11, a U-shaped hook 11c located at the other end and a contact face 11d located at the opposite side of the hook 11c.

Numeral 2 denotes a rotary member to rotate to the pinch roller member 1. The rotary member 2 has a hole 20a through which the hollow shaft 11a of the pinch roller member 1 is inserted, a projection 20b with which the contact face 11d comes in contact so as to prevent the pinch roller member 1 from rotating beyond a specified amount, hooks 20c and 20d, a first projection 20e, a second projection 20a and a contact face 20f. When the rotary member 2 rotates around the hole 20a, a first sliding face 20ef which becomes the inner peripheral surface of the first projection 20e and a second sliding face 20gf which becomes the inner peripheral surface of the second projection 20g are formed at positions where they slide along first and second rims of the cam, respectively, a described below.

A spring 4 is provided to link the hook 20c to the hook 11c of the pinch roller member 1, so that the force for pressing the pinch roller 10 against a capstan shaft described later is imparted to the pinch roller member 1.

Numeral 3 denotes a sliding member which causes the pinch roller member 1 and the rotary member 2 to slide in the direction along the shaft. The sliding member 3 has a hole 30a through which the hollow shaft 11a of the pinch roller member 1 is inserted, a hook 30b, and a contact face 30d with which the contact face 20f of the rotary member 2 comes in contact. A cylindrically shaped guide 30e is fixed at one end to movably accommodate a cam described later, and a cam follower 30c is formed so as to project inward on the inner peripheral surface of the guide 30e and slide in the cam groove of the cam described later. A spring 5 is provided to link the hook 30b to the hook 20d of the rotary member 2, so that the spring 5 and the projection 20g of the rotary member 2 impart the force to the pinch roller member 1 for pulling the pinch roller 10 away from the capstan shaft. The pinch roller member 1, the rotary member 2 and the sliding member 3 constitute the pinch roller unit.

Figure 7A:
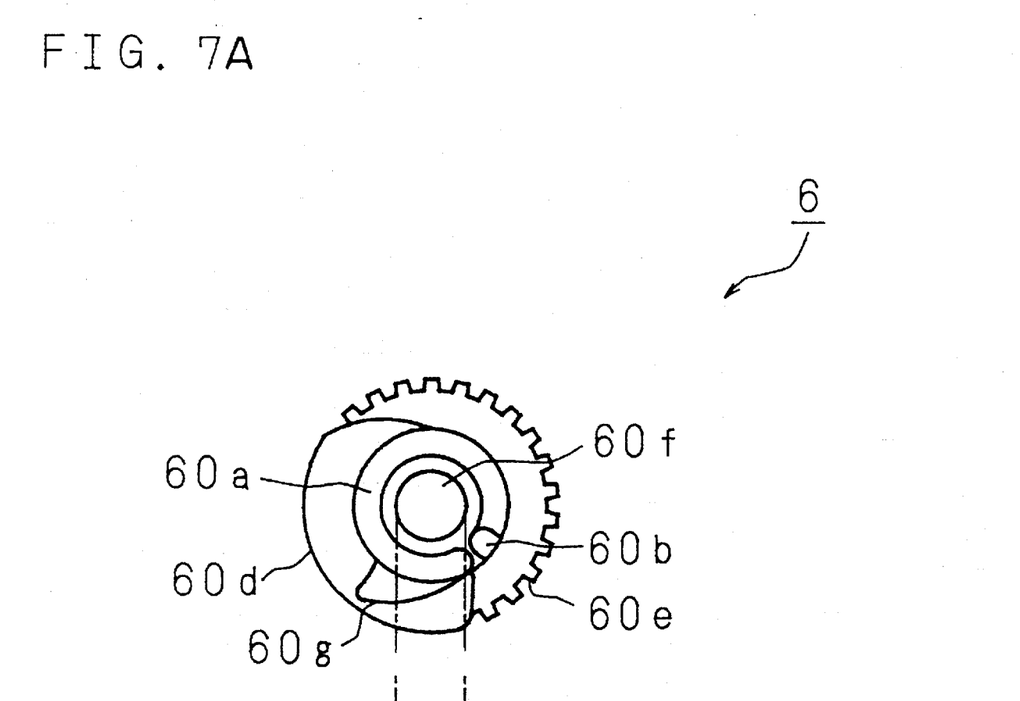
FIG. 7 is a plan view and a side view of a cam structure of the invention.
Figure 7B:
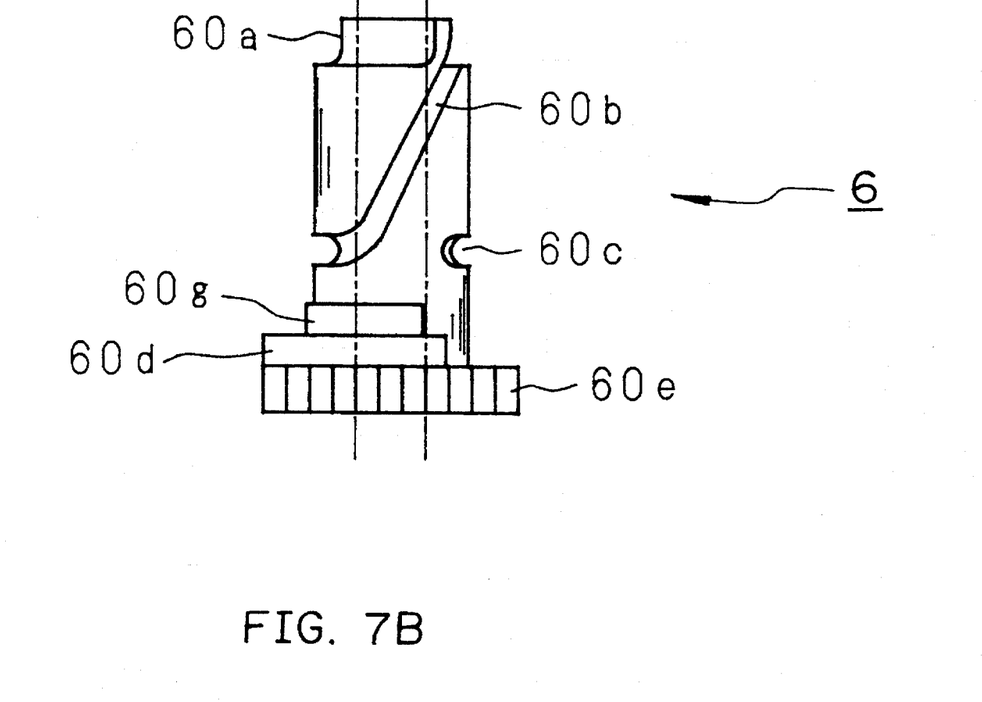

FIG. 7 is a plan view and a side view of the cam structure of the invention. In FIG. 7, numeral 6 denotes the cam having a hole 60f penetrating therethrough in the direction along a rotation axis 12b (refer to FIG. 3), and helical cam grooves 60a, 60b and 60c are cut therein and a first rim 60d, a second rim 60g and a gear 60e are provided below the cam grooves 60a, 60b and 60c. A guide 30e of the sliding member 3 is movably fitted on the periphery of the cam 6, and a cam follower 30c slides in the cam grooves 60a, 60b and 60c.

Figure 8:
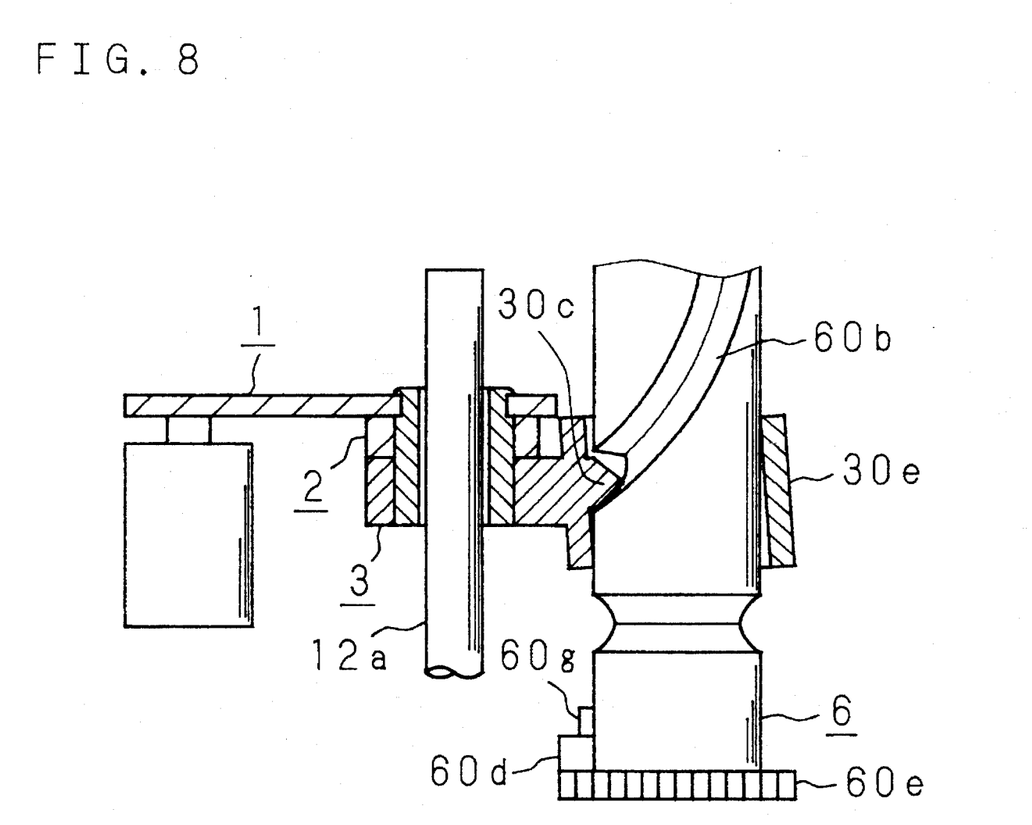
FIG. 8 is a partially sectional view of the pinch roller unit of the invention during its sliding motion.

FIG. 8 is a partially sectional view of of the pinch roller unit during its sliding movement. When the cam follower 30c slides in the cam groove 60b, because the guide 30e moves along the cam 6 as shown in the drawing, the cam follower 30c can move smoothly sliding along the cam groove 60b without coming thereoff.

As the cam follower 30c slides in the cam groove 60b and reaches the cam groove 60c, the downward movement of the pinch roller unit stops. Then as the first sliding face 20ef of the rotary member 2 rotates clockwise along the rim 60d of the cam 6, the spring 4 pulls the pinch roller member 1, thereby rotating the rotary member 2 and the pinch roller member 1 clockwise. At this time, the spring 5 is stretched.

As the pinch roller member 1 rotates clockwise as described above, the pinch roller 10 moves toward and comes in contact with the capstan shaft 8. Then the pinch roller member 1 stops the movement, while only the rotary member 2 rotates clockwise to stretch the spring 4. The resilient force of the spring 4 imparts pressing force to the pinch roller 10, and thus the loading operation is completed.

When unloading, the cam 6 is driven by the loading motor to rotate clockwise, so that the sliding member 3 rotates counterclockwise to contract the spring 5. The contracting force of the spring 5 rotates the pinch roller member 1 counterclockwise, thereby contracting the spring 4 and rotating the rotary member 2 counterclockwise, so that the pinch roller 10 moves away from the capstan shaft 8. At the same time, as the cam 6 rotates clockwise, the second sliding face 20a moves sliding along the outer peripheral surface of the second rim 60g of the cam 6. This movement imparts counterclockwise rotating force to the rotary member 2, thereby moving the pinch roller 10 completely away from the capstan shaft 8.

When the cam follower 30c of the sliding member 3 moves sliding in the cam groove 60b of the cam 6 and the pinch roller unit moves upward thereby moving the second sliding face 20gf away from the rim 60g, the pinch roller member 1 is driven by the contracting force of the spring 5 to rotate counterclockwise so that the pinch roller 10 rotates in such a direction as to move away from the capstan shaft 8.

According to the invention, because the pinch roller unit is provided with the guide member to slide in the groove as described above, the cam follower moves smoothly without coming off the groove during the loading/unloading operation. Also because the pinch roller unit is provided with the sliding face to slide along the rim of the cam in such a direction as the pinch roller moves away from the capstan shaft, it is possible to impart rotating force other than the resilient force of the spring to the pinch roller, and the pinch roller can be moved completely away from the capstan shaft during the unloading.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A tape loading mechanism, comprising:

a pinch roller guiding a magnetic tape to a peripheral surface of a capstan shaft;

a pinch roller unit rotatably supporting said pinch roller and having a first contact surface, said pinch roller unit being pivotally movable about a first axis substantially parallel to a rotation axis of said capstan shaft for moving said pinch roller toward and away from said capstan shaft; and a cam rotatable about a center axis in a longitudinal direction thereof substantially parallel to said rotation axis of said capstan shaft, said cam having a first rim, wherein said first rim contacts with said first contact surface to move said pinch roller away from said capstan when said cam is rotating in a direction to unload said magnetic tape.

2. A tape mechanism of claim 1, wherein said pinch roller unit has a cam follower and is movable along said first axis, said cam having a helical groove formed on a peripheral surface thereof for engaging with said cam follower, thereby moving said pinch roller unit along said first axis by a rotation of said cam.

3. A tape mechanism of claim 1, wherein said cam has a second rim; and said pinch roller unit has a second contact surface contacting with said second rim to urge said pinch roller toward said capstan shaft when said cam is rotating in a direction to load said magnetic tape.

4. A tape loading mechanism, comprising:

a pinch roller guiding a magnetic tape to a peripheral surface of a capstan shaft;

a pinch roller unit rotatably supporting said pinch roller and having a cam follower, said pinch roller unit being pivotally movable about a first axis substantially parallel to a rotation axis of said capstan shaft for moving said pinch roller toward and away from said capstan shaft, and said pinch roller unit being movable along said first axis; and a cam rotatable about a center axis in a longitudinal direction thereof substantially parallel to said rotation axis of said capstan shaft, said cam having a helical groove formed on an outer peripheral surface thereof for engaging with said cam follower, thereby moving said pinch roller unit along said first axis by a rotation of said cam, wherein said pinch roller unit includes a guide member for contacting with said outer peripheral surface of said cam, thereby preventing disengagement of said cam follower and said helical groove.

5. A tape loading mechanism of claim 4, wherein said guide member is annular and an inner peripheral surface of said guide member contacts with said outer peripheral surface of said cam as said guide member moves along said center axis of said cam.

6. A tape loading mechanism of claim 5, wherein said cam follower is provided at said inner peripheral surface of said guide member.

7. A tape loading mechanism of claim 4, wherein said cam follower and said guide member are integral.

8. A tape loading mechanism of claim 4, wherein said guide member has a tubular shape so as to surround said cam.

* * * * *